(12) United States Patent
Adolphson et al.

(10) Patent No.: US 11,310,334 B1
(45) Date of Patent: Apr. 19, 2022

(54) AUTOMATIC SMART PROPAGATION OF CACHING DIRECTIVES

(71) Applicant: BBY SOLUTIONS, INC., Richfield, MN (US)

(72) Inventors: David Adolphson, Apple Valley, MN (US); Praveen Kotla, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 17/159,806

(22) Filed: Jan. 27, 2021

(51) Int. Cl.
*H04L 12/14* (2006.01)
*H04L 29/08* (2006.01)
*H04L 67/5682* (2022.01)
*H04L 67/02* (2022.01)

(52) U.S. Cl.
CPC .......... *H04L 67/2852* (2013.01); *H04L 67/02* (2013.01)

(58) Field of Classification Search
USPC ........................................................ 709/203
See application file for complete search history.

(56) References Cited

U.S. PATENT DOCUMENTS

| 6,732,237 | B1* | 5/2004 | Jacobs | G06F 12/0897 |
| | | | | 711/119 |
| 8,984,048 | B1* | 3/2015 | Maniscalco | H04L 67/10 |
| | | | | 709/203 |
| 10,237,363 | B2* | 3/2019 | Stevens | H04L 67/2804 |
| 10,547,585 | B2* | 1/2020 | Wein | H04L 67/1002 |
| 2013/0326022 | A1* | 12/2013 | Ehrlich | G06F 16/9574 |
| | | | | 709/219 |
| 2014/0006484 | A1* | 1/2014 | Devanneaux | H04L 69/16 |
| | | | | 709/203 |
| 2017/0085667 | A1* | 3/2017 | Flack | H04L 67/2842 |
| 2018/0173673 | A1* | 6/2018 | Daglis | G06F 9/524 |

* cited by examiner

*Primary Examiner* — Jude Jean Gilles
(74) *Attorney, Agent, or Firm* — Schwegman Lundberg & Woessner, P.A.

(57) ABSTRACT

Systems and techniques for automatic smart propagation of caching directives are described herein. A request may be received for an object of a webpage. A cache state may be determined for a cache control header retrieved for the object. A time to live value may be calculated for the object based on the cache state and a header time to live value included in the cache control header. A cache directive that includes the time to live value may be stored for the object in a cache. The object may be updated in the cache upon receipt of a subsequent request based on the cache directive.

21 Claims, 8 Drawing Sheets

AUTOMATIC SMART PROPAGATION OF CACHING DIRECTIVES

TECHNICAL FIELD

Embodiments described herein generally relate to web content edge caching and, in some embodiments, more specifically to automatic smart propagation of caching directive for an content delivery network.

BACKGROUND

It may be beneficial to serve web pages to users as fast as possible. Having an entire web page (or a large percentage of the web page) served directly to the user from a content delivery network (CDN) may decrease the time it takes to deliver a web page to the user. Additionally, serving directly from the CDN may be less costly, because less traffic traverses the internet to reach backend application servers. While existing approaches may enable serving web site traffic from a CDN, however, these approaches fail to provide efficient caching of dynamically chosen (selected) content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the context of large and complex web sites (eCommerce, etc.), many systems contribute to serving pages on a site and, typically, each system is responsible for a specific domain (e.g., pricing, searching, fulfillment, etc.) and a specific function (e.g., rendering views, providing data via application programming interfaces (APIs), executing business processes, etc.).

In order to improve the performance of the web site itself, many systems will typically cache the response of requests. This caching may occur at various application tiers between the underlying data sources (e.g., database, etc.) and a content delivery network (CDN). Caching may be static (e.g., always cache for X minutes, etc.) or dynamic caching using a more advanced time value. The various domains within the system are best equipped to make smart caching decisions or directives because these domain systems own the lifecycle of their data topics. For example, some domains know exactly when their data topics will change in the future. Other domains may predict the likelihood of their data changing in the next X minutes or hours. Other domains may simply express a desire for completely unpredictably changing data topics to only remain potentially stale in the cache for a certain period of time.

The systems and techniques discussed herein provide a set of library functions that work together to leverage caching directives from the underlying domains. Given cache directives from domain systems as part of the response when domain data is requested, optimal caching is enabled at the caching tiers (including both application and CDN tiers) even as aggregation, rendering, and other systems combine data topics. At each tier, the totality of caching directives incoming are considered both for use in a cache of a current tier and for the one or more directives sent back to the calling system(s) (e.g., towards the user requesting the web page, etc.).

Figure 1:
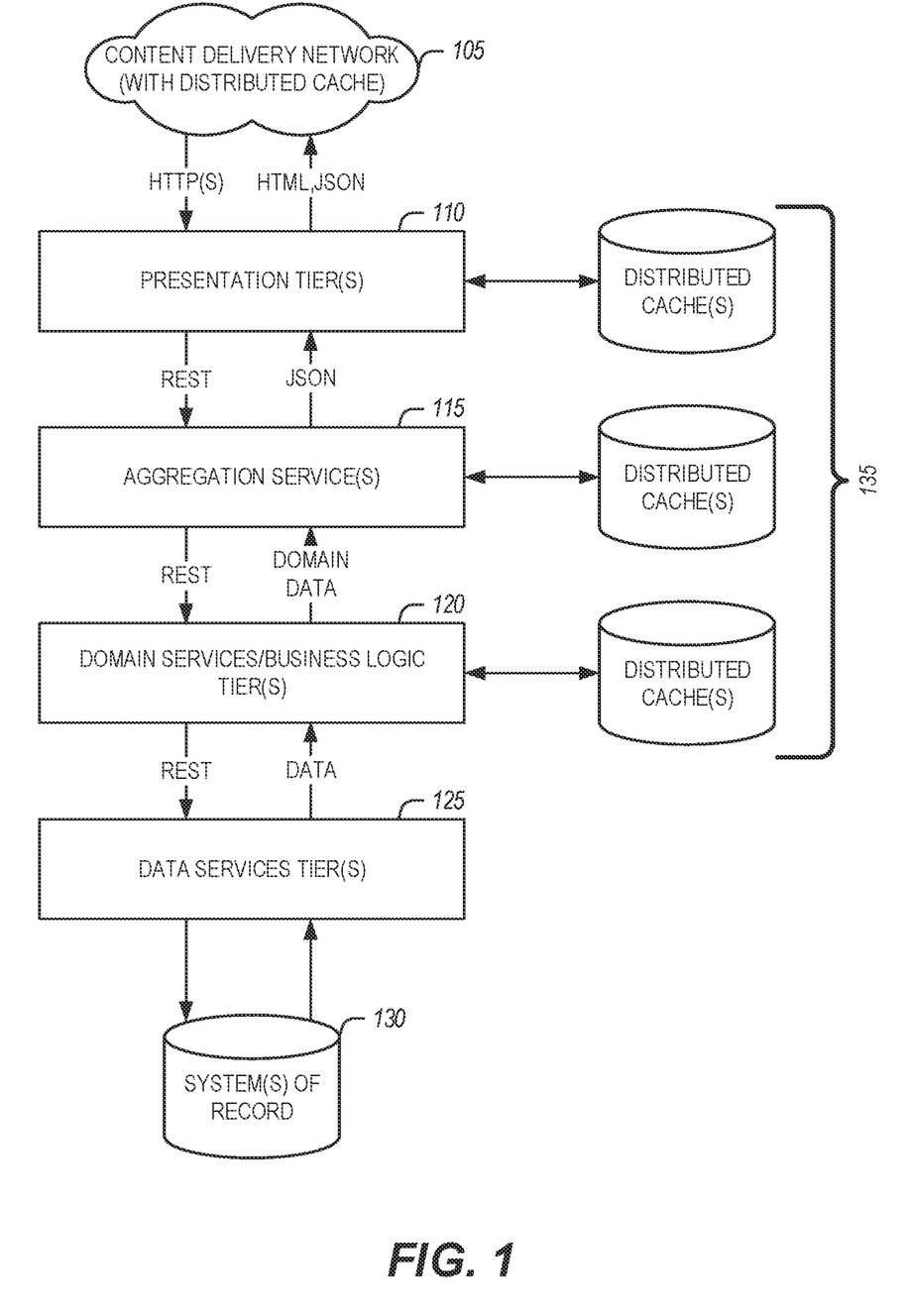
FIG. 1 is a block diagram of an example of a system for automatic smart propagation of caching directives, according to an embodiment.

FIG. 1 is a block diagram of an example of a system 100 for automatic smart propagation of caching directives, according to an embodiment. The system 100 includes a content delivery network (CDN) 105, presentation tier(s) 110, aggregation service(s) 115, domain services/business logic tier(s) 120, data services tier(s) 125, system(s) of record 130. The presentation tier(s) 110, the aggregation service(s) 115, the domain services/business logic tier(s) 120, and the data services tier(s) 125 may communicate with respective distributed cache(s) 135. The domain services/business logic tier(s) 120 are allowed (but not required) to define multiple caching directives for each response for each data topic. Caching directives may include, by way of example and not limitation:

Fresh cache time—if the distributed cache(s) 135 is less than a given age, serve a response from the distributed cache(s) 135. This may be communicated via a standard hypertext transfer protocol (HTTP) Header Cache-Control: max-age=<duration>, etc.

Stale cache time—if the distributed cache(s) 135 is less than a given age and greater than the fresh cache time, serve a response from the distributed cache(s) 135 and asynchronously refresh the distributed cache(s) 135 with a request/response. This may be communicated via a standard HTTP Header Cache-Control: stale-while-revalidate=<duration>, etc.

Expired cache time—if the distributed cache(s) 135 is less than a given age and greater than the stale cache time, attempt to make a request for a new response—if this succeeds, serve this response and store it in the distributed cache(s) 135—if this fails, serve the expired response from the distributed cache(s) 135. This may be communicated via a standard HTTP Header Cache-Control: stale-if-error=<duration>, etc.

These directives enable the following two scenarios (and others) to be optimally cached at each tier. (1) The domain services/business logic tier(s) 120 has actual time lined data meaning the domain services/business logic tier(s) 120 is certain that data will change (or be deleted) at a certain time in the future. (2) The domain services/business logic tier(s) 120 has no idea when any data may change in the future, but the domain services/business logic tier(s) 120 wants actual changes reflected on the site within a certain approximate timeframe. If the domain services/business logic tier(s) 120 computes a probability of change per data topic or per data entity, the result of that computation may be optimally leveraged.

In a time lined data scenario, the system that owns the lifecycle of the data topic (e.g., the domain services/business logic tier(s) 120) has actual time lined data meaning they are certain that data will change (or be deleted) at a certain time in the future. An example of this may be a configured state of web pages that change on a schedule, such as a "Daily Deals" page. Another example may be prices of products that change at predetermined dates and times.

In an unpredictable changing data scenario, the domain services/business logic tier(s) 120 has no guarantee when any data may change in the future, but the domain services/business logic tier(s) 120 wants actual changes reflected on the site within a certain approximate timeframe. An example of this may be the inventory of a product for sale. There is no way to predict exactly when a product will be sold out. However, the domain services/business logic tier(s) 120 may be able to predict the likelihood of the product selling out in some particular time window and caching directives may be generated based on this computation.

Cache states, including fresh cache time, stale cache time, and expired cache time as described above, are used to enable the domain services/business logic tier(s) 120 to perform automatic smart propagation of cache directives. If the cached data is older than the expired cache time, then even if the request for a new response fails, a failure will be returned to the calling system. Data is stored in the distributed cache(s) 135 longer than this time so that the configured duration of the values (e.g., fresh, stale, expired) may be adjusted on-the-fly to take advantage of data already cached.

Figure 2:
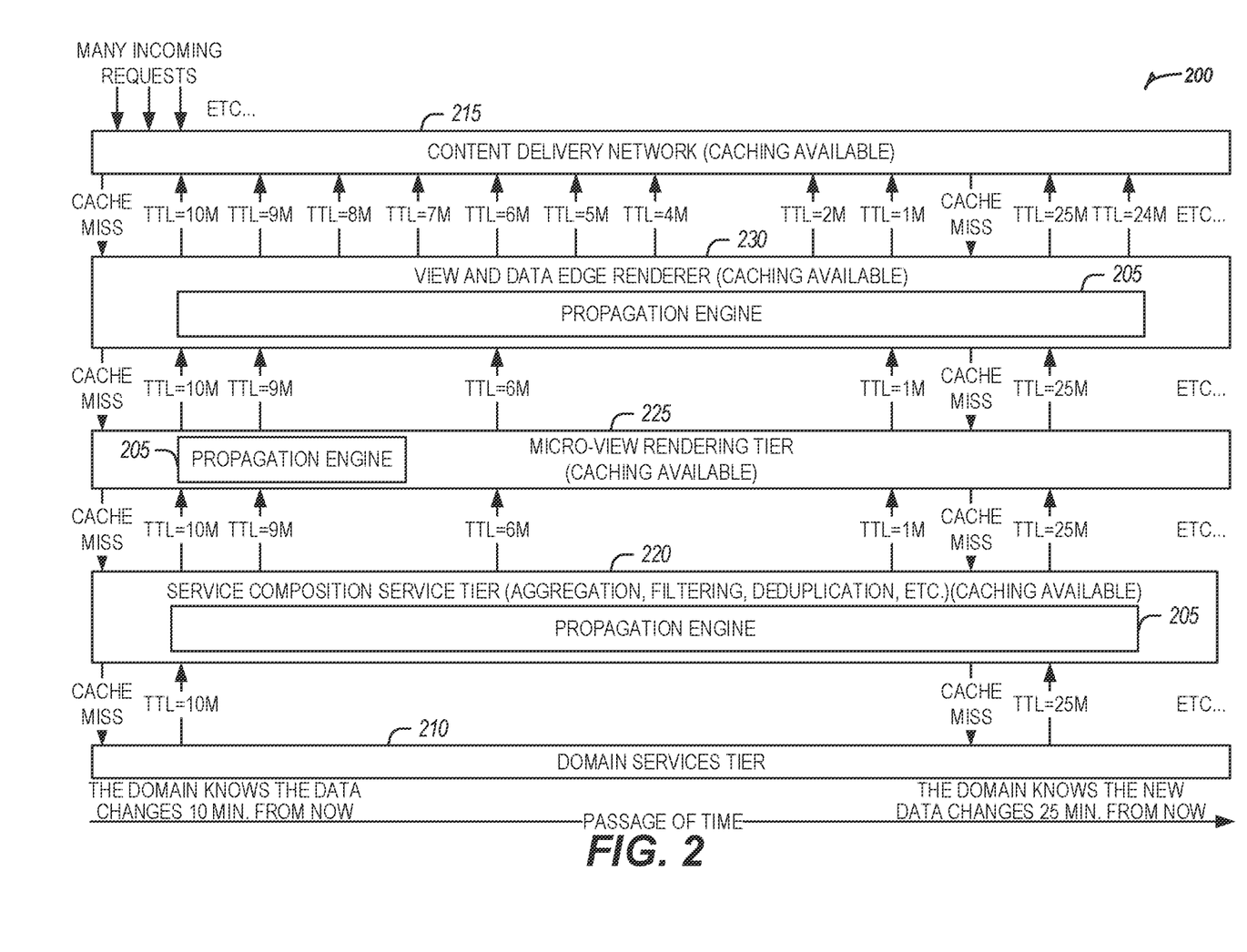
FIG. 2 illustrates a flow diagram of an example of a time-line data scenario for automatic smart propagation of caching directives, according to an embodiment.

In the time lined data scenario above, for optimal cache operation, there is typically no desire for any stale time because the exact timing of a change in data is known. In the unpredictable changing data scenario, optimal cache operation will include a stale window, and the fresh plus stale value should equal the total time-to-live (TTL) desired from the domain services/business logic tier(s) 120. Some domain services/business logic tier(s) 120 may want long fresh but short stale, others might want the opposite. A ratio or separate fixed values (e.g., for fresh and stale) may be used as necessary. These two "fixed values" may be used by the propagation engine 205 as a default when the domain services/business logic tier(s) 120 does not send a cache control header or similar directive.

FIG. 2 illustrates a flow diagram of an example of a time-line data scenario 200 for automatic smart propagation of caching directives, according to an embodiment. The time lined data scenario 200 may provide features as described in FIG. 1.

The time-line data scenario 200 includes a propagation engine 205 that includes a series of software libraries and functions that may be deployed with each application tier between the domain services 210 and the CDN 215. The propagation engine 205 may be integrated into an underlying application in a way that allows it to intercept incoming and outgoing HTTP traffic and maintains a context state that lasts for the duration of a single incoming request-response within the application.

In the time-line data scenario 200, instances of the propagation engine 205 are configured as shown in Table 1.

TABLE 1

| Config | Description |
|---|---|
| freshTTL = 10 minutes | This "default" will only be used if the domain service 210 (or other downstream system) fails to return a valid cache-control header in its response. |
| staleTTL = 0 minutes | This "default" will only be used if the domain service 210 (or other downstream system) fails to return a valid cache-control header in its response. No stale window is the optimal configuration for time lined data topics. |
| expiredTTL = 60 minutes | This "default" will only be used if the domain service 210 (or other downstream system) fails to return a valid cache-control stale-if-error in its response. This is a duration beyond the total TTL (fresh plus stale). |
| freshRatio = 1 | 100% of the total TTL is considered "fresh" because no stale window is the optimal configuration for time lined data topics. Used when the propagation engine 205 receives a valid cache-control max-age or Expires header, but no cache-control stale-while-revalidate header. |
| maximumTTL = 24 hours | Provides a safe boundary condition for cache duration |
| minimumTTL = 1 minute | Provides a safe boundary condition for cache duration |
| upstreamCacheControlHeader = freshTTL + staleTTL | This "formula" is how the propagation engine 205 computes the appropriate value for the cache-control header (or similar directive) sent to the calling system from the current system the propagation engine 205 is executing within. |
| enableRespectCacheControlHeader = true | Can be used to disable reading the cache-control headers while maintaining other functionality (falls back on default configuration) |

The configuration in Table 1 may be used globally for the propagation engine 205 within a given application tier or it may be tuned per endpoint that the given tier consumes.

If a request handled by the propagation engine 205 within a service composition service tier 220 goes downstream to a time lined domain services 210 API in this scenario and the API returns a valid cache-control header with a cache-control max-age TTL (or an Expires timestamp) within the configured minimumTTL and maximumTTL, then the propagation engine 205 would store the data in cache and consider this cached entity to be fresh for the duration specified by the header. The propagation engine 205 would then send a cache directive property on each attribute (or set of attributes) sent to a micro-view rendering tier 225. The propagation engine 205 will ensure that this value sent to the micro-view rendering tier 225 is never lower than the minimumTTL and is also rounded up to the nearest minimumTTL increment. For example, if the minimumTTL is one minute and the cache control header from the domain service says 190 seconds, the propagation engine 205 will round up 190 seconds to four minutes. The propagation engine 205 will also ensure that there is metadata stored in the cached object so that the propagation engine 205 may track the expiration time so it may return the correct max-age TTL as subsequent requests hit the service composition service tier 220 throughout the duration of the fresh cache time window. The subsequent requests may be from different micro view components in the micro-view rendering tier 225 that use the same domain services 210. In this scenario, the entire TTL from the domain service 210 should be considered the fresh time—there is no stale window after the fresh time because this data topic is time lined.

In the micro-view rendering tier 225 the propagation engine 205 performs the task of combining the cache directive properties (if more than one was received) from calls to the service composition service tier 220 by returning the lowest value as a cache-control max-age header up to a view and data edge renderer 230. The micro-view rendering tier 225 is an example of a tier that does not do any caching itself, but still needs to participate in the cache control header directive propagation.

In the view and data edge renderer 230, the propagation engine 205 behaves very similarly to the way it does in the service composition service tier 220. The propagation engine 205 would store the data in cache and consider this cached entity to be fresh for the duration specified by the header and passes the same cache-control header up to the CDN 215. As more requests come in from the CDN 215 for this same cached object, the propagation engine 205 will reduce the max-age TTL appropriately so that the CDN 215 cache expires at (approximately) the correct time (e.g., very shortly after the time lined data has changed, etc.), Like with the service composition service tier 220, in the view and data edge renderer 230 the propagation engine 205 will round up to the next minimumTTL increment and will not send a cache-control value to the CDN 215 that is lower than the minimumTTL. In the view and data edge renderer 230 the propagation engine 205 will also respect the minimumTTL with its own cached objects.

There may be two distinct configurations for minimumTTL and maximumTTL used by the propagation engine 205 at any tier. One set is used by the propagation engine 205 for its own behavior in storing/reading from cache as necessary. The other set is used by the propagation engine 205 for controlling the behavior of the cache-control headers outputted and sent to the calling system (including the CDN 215) as necessary.

Figure 3:
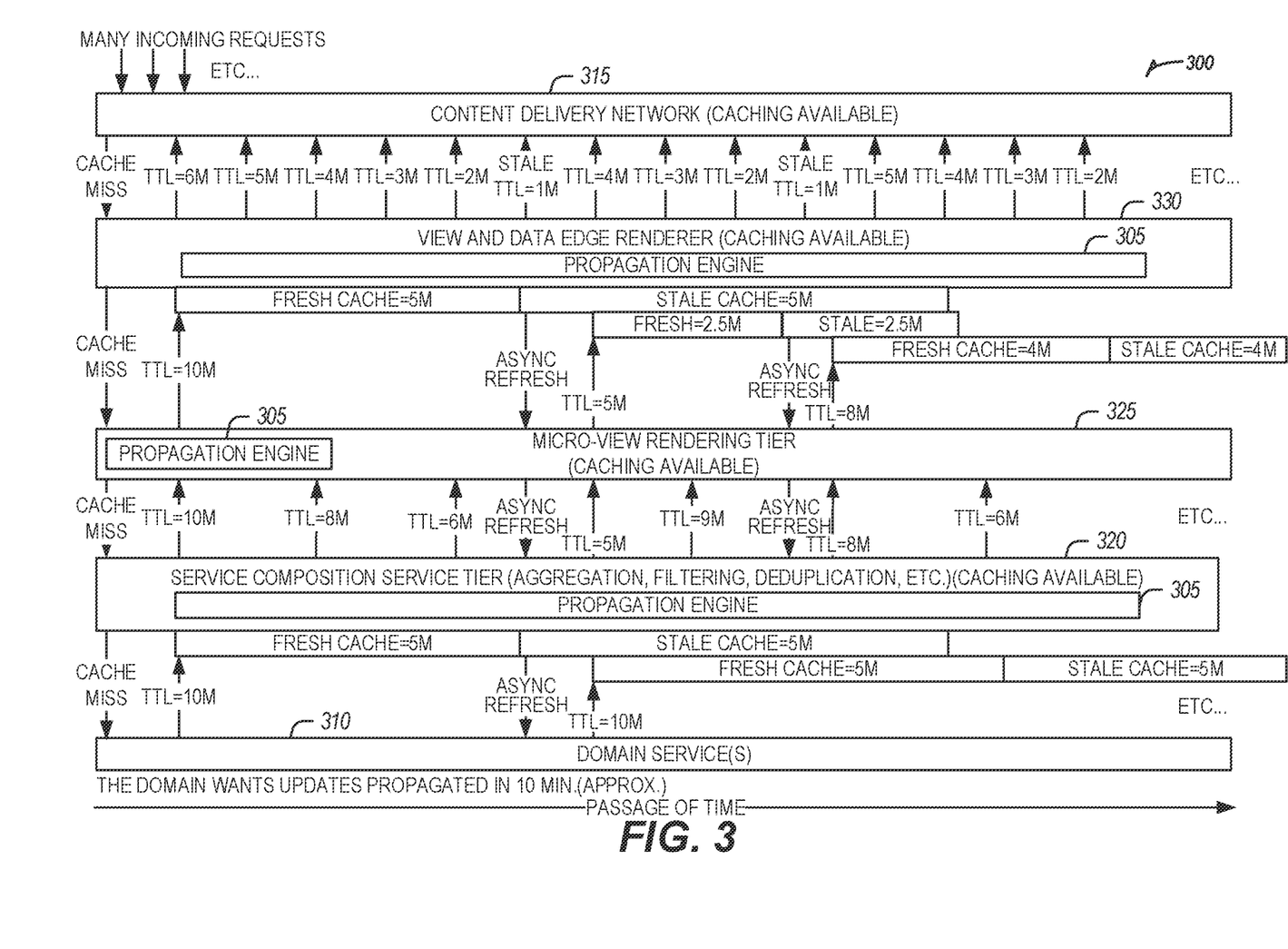
FIG. 3 illustrates a flow diagram of an example of an unpredictable changing data scenario for automatic smart propagation of caching directives, according to an embodiment.

FIG. 3 illustrates a flow diagram of an example of an unpredictable changing data scenario 300 for automatic smart propagation of caching directives, according to an embodiment. The unpredictable changing data scenario 300 may provide features as described in FIG. 1.

In the unpredictable changing data scenario 300, the domain service data is not on a timeline (e.g., the TTL merely represents a desire for unpredictable updates to be reflected on the site within a certain time range).

The unpredictable changing data scenario 300 includes properties to be set to throughout the application delivery stack. Instances of a propagation engine 305 distributed throughout the application delivery stack are configured as shown in Table 2.

TABLE 2

| Config | Description |
| --- | --- |
| freshTTL = 10 minutes | This "default" will only be used if a domain service 310 (or other downstream system) fails to return a valid cache-control header in its response. |
| staleTTL = 10 minutes | This "default" will only be used if the domain service 310 (or other downstream system) fails to return a valid cache-control header in its response. No stale window is the optimal configuration for time lined data topics. |
| expiredTTL = 60 minutes | This "default" will only be used if the domain service 310 (or other downstream system) fails to return a valid cache-control stale-if-error in its response. This is a duration beyond the total TTL (fresh plus stale). |

TABLE 2-continued

| Config | Description |
| --- | --- |
| freshRatio = 0.5 | 50% of the total TTL is considered "fresh" because having a stale window is the optimal configuration for non-time lined data topics. Used when the propagation engine 305 receives a valid cache-control max-age or Expires header, but no cache-control stale-while-revalidate header. |
| maximumTTL = 24 hours | Provides a safe boundary condition for cache duration |
| minimumTTL = 1 minute | Provides a safe boundary condition for cache duration |
| upstreamCacheControlHeader | This "formula" is how the propagation engine 305 computes the appropriate value for the cache-control header (or similar directive) sent to the calling system from the current system the propagation engine 305 is executing within. In the example above this is set to "freshTTL + staleTTL" in a service composition service tier 320 and "freshTTL + minTTL" in the view and data edge renderer 330. |
| enableRespectCacheControlHeader = true | May be used to disable reading the cache-control headers while maintaining other functionality (falls back on default configuration) |

The configuration in Table 2 may be used globally for the propagation engine 305 within a given application tier, or it may be tuned per endpoint that the given tier consumes.

Figure 4A:
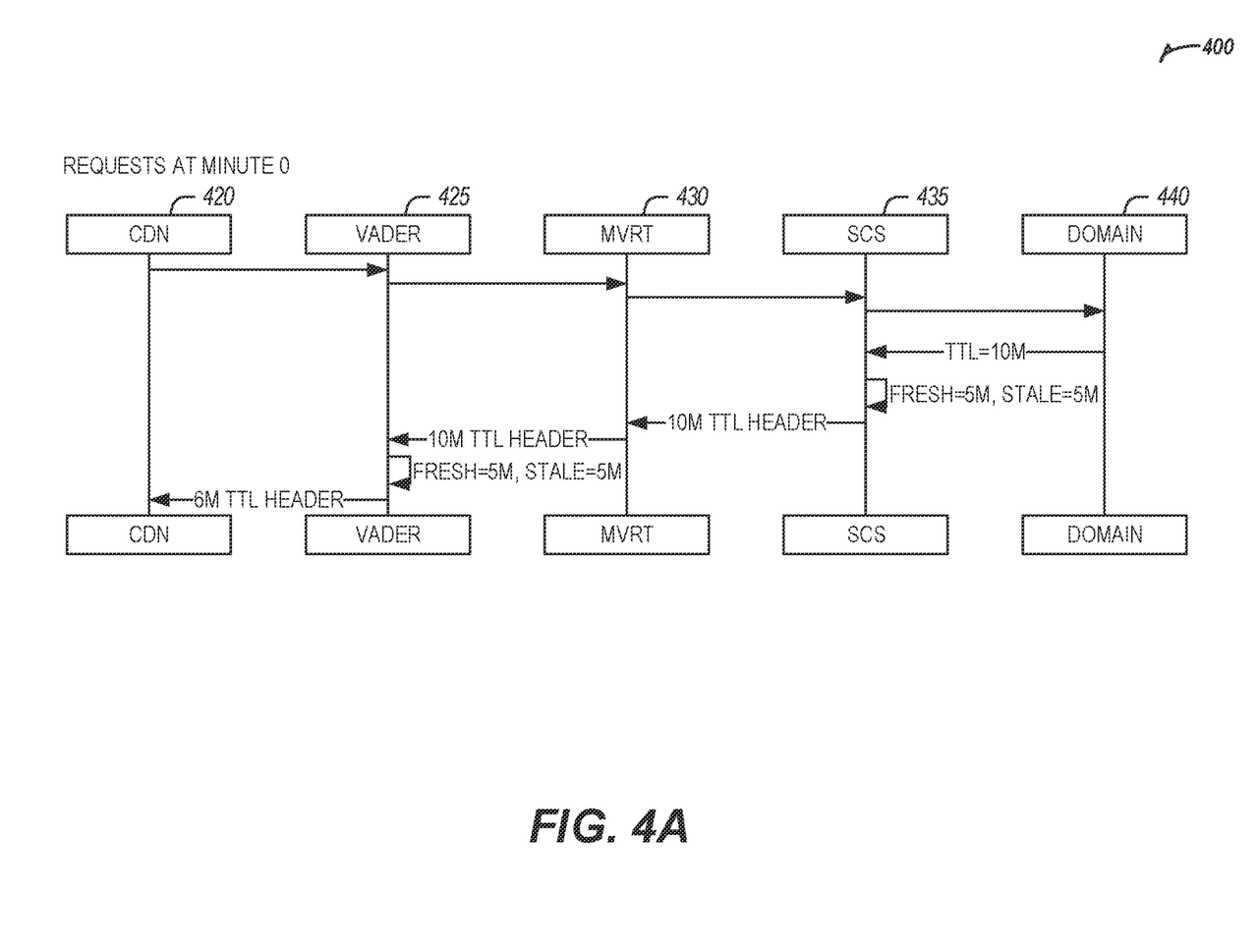
FIGS. 4A to 4C illustrate request flows based on cache time in an unpredictable changing data scenario for automatic smart propagation of caching directives, according to an embodiment.
Figure 4B:
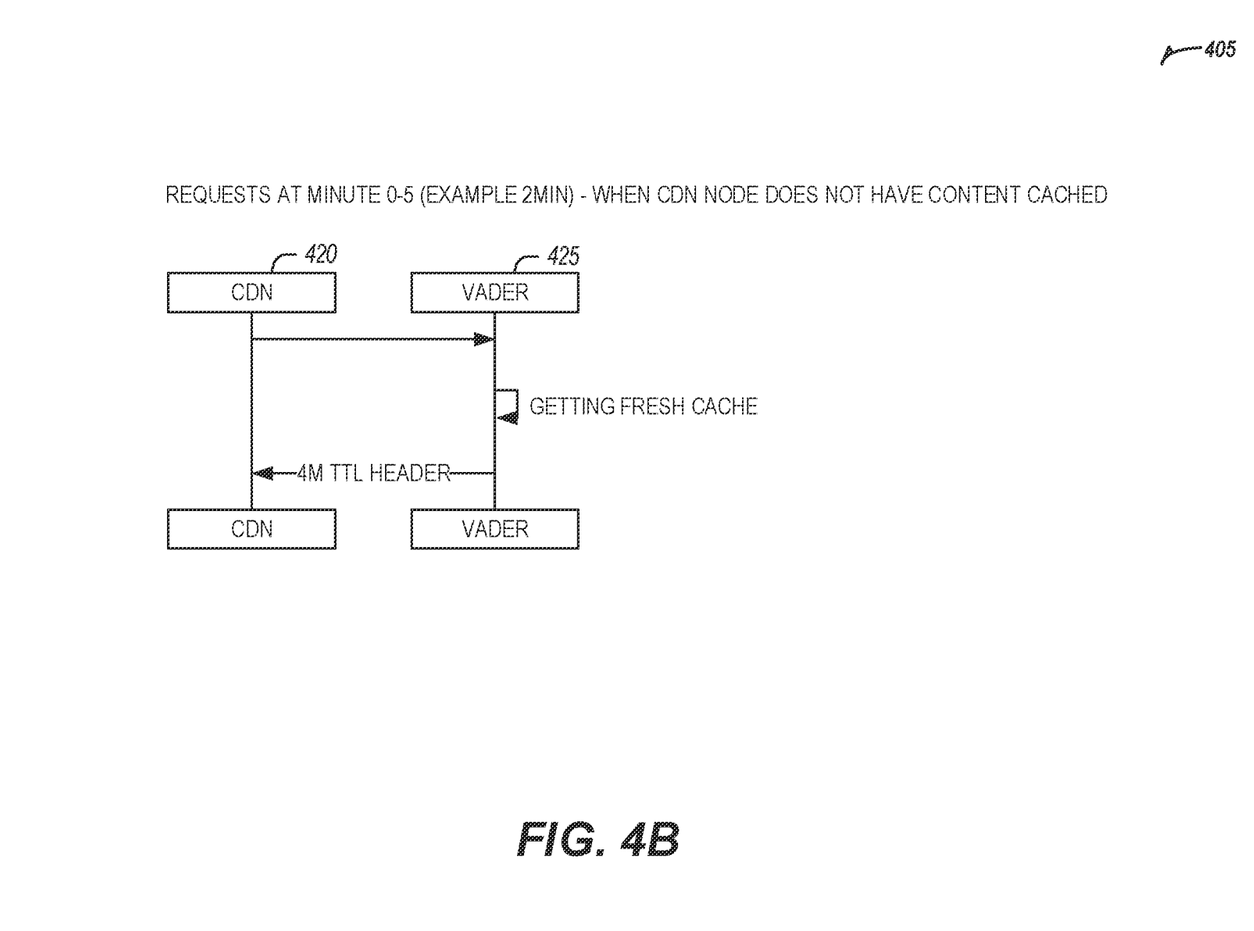
Figure 4C:
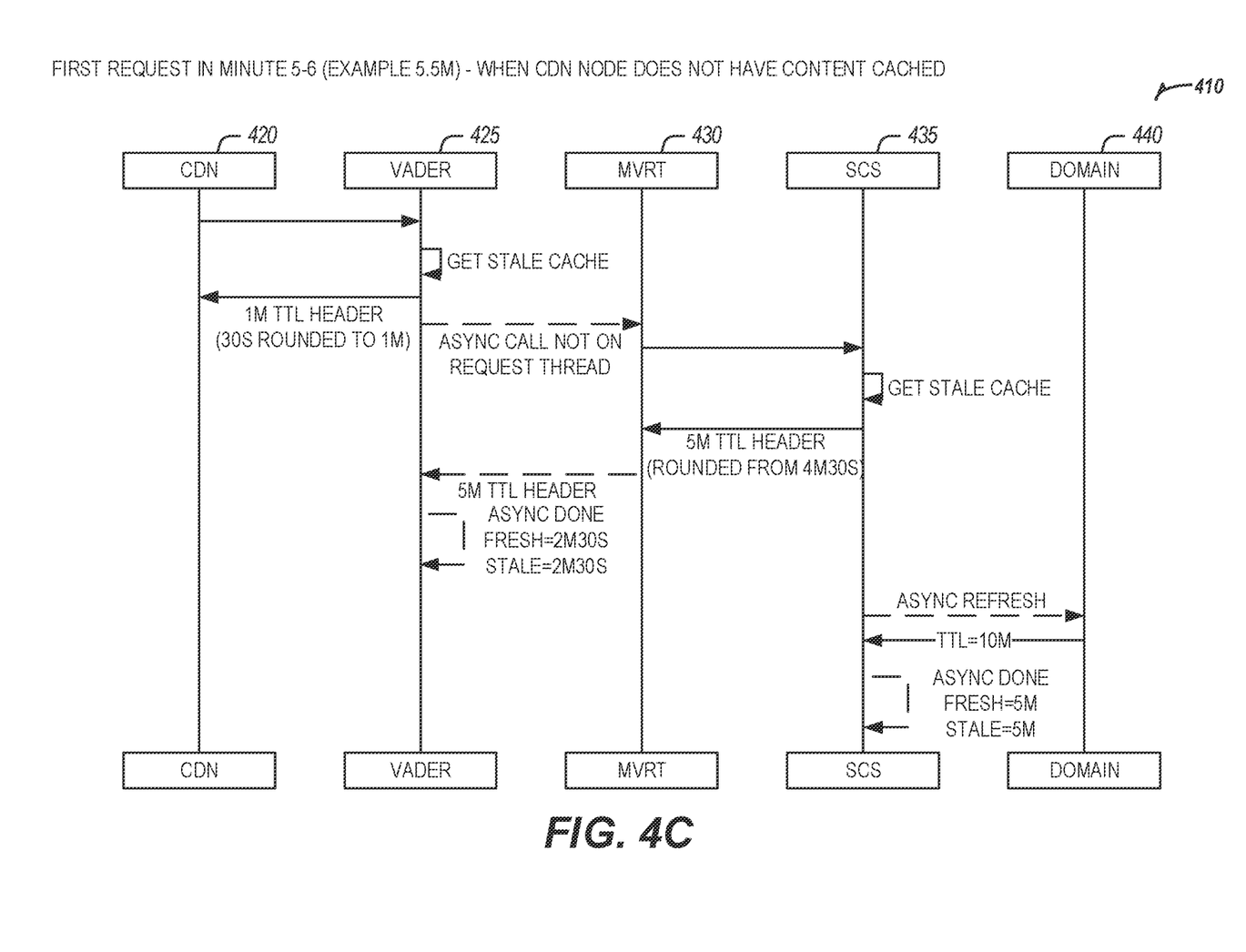

FIGS. 4A to 4C illustrate request flows 400, 405, and 410 based on cache time in an unpredictable changing data scenario for automatic smart propagation of caching directives, according to an embodiment. The request flows 400, 405, and 410 may provide features as described in FIGS. 1 and 3.

When the service composition service (SCS) tier 435 obtains a domain service 440 response to be cached, the service composition service tier 435 sends a cache-control directive up to a micro-view rendering tier (MVRT) 430 (and eventually to the view and data edge renderer (VADER) 425) that is equal to the total cache time used by the service composition service tier 435 (e.g., fresh plus stale) rounded up to the nearest minimumTTL increment. In an unpredictable changing data scenario (e.g., as described in FIG. 3), a domain service 440 with a ten minute total TTL which the service composition service tier 435 treats as freshTTL=5 m and staleTTL=5 m causes the service composition service tier 435 to send a 10 m TTL up to the view and data edge renderer 425 (via the micro-view rendering tier 430). If the domain service 440 returned a 610 second TTL (e.g., ten minutes, ten seconds) the service composition service tier 435 would round that up to eleven minutes in the cache-control directive sent up to the calling systems.

When the view and data edge renderer 425 obtains a rendered component to be cached with a cache-control header TTL that is valid, the view and data edge renderer 425 will use half this TTL for fresh cache duration and the other half for stale cache. Then, view and data edge renderer 425 sends to a CDN 420 a TTL that is one minute (e.g., the value the minimumTTL config is set to) longer than the fresh cache duration rounded up to the next whole minute. If there is no valid cache-control header, the view and data edge renderer 425 will use the default freshTTL in the configuration.

In scenarios that include aggregated micro-views, if the view and data edge renderer 425 is stitching multiple micro-view renders of the tier 430 into a single response to the CDN 420 (e.g., such as an edge side includes (ESI) fragment) then a propagation engine (e.g., the propagation engine 305 as described in FIG. 3) within the view and data edge renderer 425 will compute the lowest of all TTLs of all the micro-view renders of the tier 430 grouped into the single CDN 420 response.

In scenarios that involve thundering herds, the minimumTTL configuration value along with an ability of the propagation engine to round up to the nearest minimumTTL increment will help control thundering herds. In the context of a large web site that utilizes caching, the thundering herd problem is when certain cached entities that are commonly used are evicted (or marked as expired) at the same time, causing a flood of traffic that are all cache-misses (at the CDN and usually other tiers as well). A specific example would be on a website with global header/footer components and data. These entities are on every single page and are thus pulled from cache for every single user page load—except when these caches expire. This causes a transition from having almost no traffic (a few requests per second) to many thousands of requests per second in an instant. The systems and techniques discussed herein spreads out this herd from an instant to a distribution of traffic over the minimumTTL value—usually 1 minute. Any time lined data topic will fall out of cache not at a single moment within the CDN 420, but over the duration of the configured minimumTTL value. Because this is configurable, the propagation engine may support whatever traffic patterns occur with whatever underlying infrastructure capacity that is available.

There are a number of unique benefits to a system (e.g., such as an ecommerce website, other high-traffic web site, etc.) that makes use of the propagation engine including: enabling systems of record (or replicas of systems of record) to fully own the lifecycle of their data throughout all web-scale application tiers and their caches including any CDN 420 cache, providing automatic and configurable self-distributed denial-of-service (DDOS) protection to ensure that time lined data topics do not create an unmanageable thundering herd of requests to applications within the stack, supporting performance enhancements and reliability optimizations via dynamically adding stale cache state support and expired cache error state support when not specified by the system of record, automatically optimally handling aggregation of data topics with different lifecycles and different types of lifecycles (e.g., time lined data, non-time lined data, etc.), allowing dynamic reconfiguration that may be leveraged during an outage of a system to immediately fall back on previously cached data without the downsides of using old data during normal operation, etc.

Conventional caching techniques may use standard HTTP response headers including cache-control, get/put data to/from caching system, a simple method for serving expired data when unable to repopulate cache with fresh data, or the concept of fresh vs stale vs expired cache data as described in HTTP RFC 5861 titled "HTTP Cache-Control Extensions for Stale Content" as published by the Internet Engineering Task Force (IETF) in May 2010. However, the conventional caching techniques do not leverage capabilities in concert by a propagation engine that automatically propagate the directives through a multi-tier application architecture and is able to optimize cache directive propagation in a time-line data scenarios and unpredictable changing data scenarios.

Figure 5:
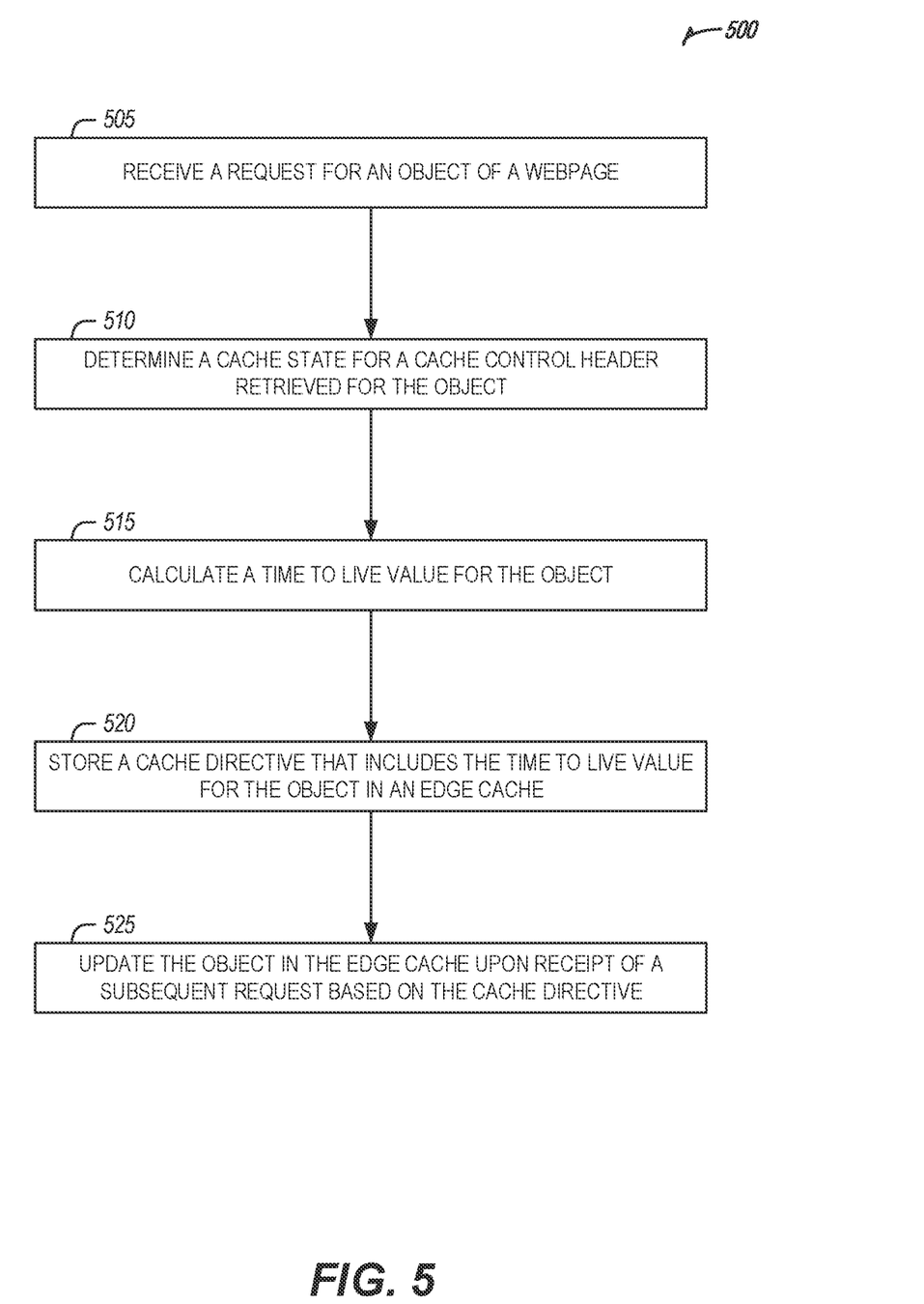
FIG. 5 illustrates a flow diagram of an example of a method for automatic smart propagation of caching directives, according to an embodiment.

FIG. 5 illustrates a flow diagram of an example of a method 500 for automatic smart propagation of caching directives, according to an embodiment. The method 500 may provide features as described in FIGS. 1 to 3 and 4A to 4C.

At operation 505, a request may be received (e.g., by a propagation engine (e.g., the propagation engine 205 as described in FIG. 2, the propagation engine 305 as described in FIG. 3, etc.)) for an object of a webpage.

At operation 510, a cache state may be determined (e.g., by the propagation engine) for a cache control header retrieved for the object. In an example, the cache state may indicate a status of the object in the cache between a time the object is stored in a cache and a time the object in the cache is expired. At operation 515, a time to live value may be calculated (e.g., by the propagation engine) for the object based on the cache state and a header time to live value included in the cache control header. In an example, the time to live value may include a fresh time to live portion and a stale time to live portion. The object may be retrieved from the cache when a time of the subsequent request falls within the fresh time to live portion and the object may be validated or updated asynchronously when the time of the subsequent request falls within the stale time to live portion. In an example, a minimum time to live value and a maximum time to live value may be generated for the object and the cache state may be determined at least in part using the minimum time to live value and the maximum time to live value.

At operation 520, a cache directive may be stored that includes the time to live value for the object to be put in the edge cache. In an example, metadata for the object may be stored in the edge cache that includes an expiration time for the object or a maximum age value may be returned that is calculated from the expiration time in response to receipt of the subsequent request. In an example, the maximum age value may be calculated by rounding a lowest maximum age value from a set of maximum age values for the object.

At operation 525, the object in the edge cache may be updated upon receipt of a subsequent request based on the cache directive. In an example, the object may be updated based on a determination that a time of the subsequent request exceeds the maximum age value.

Figure 6:
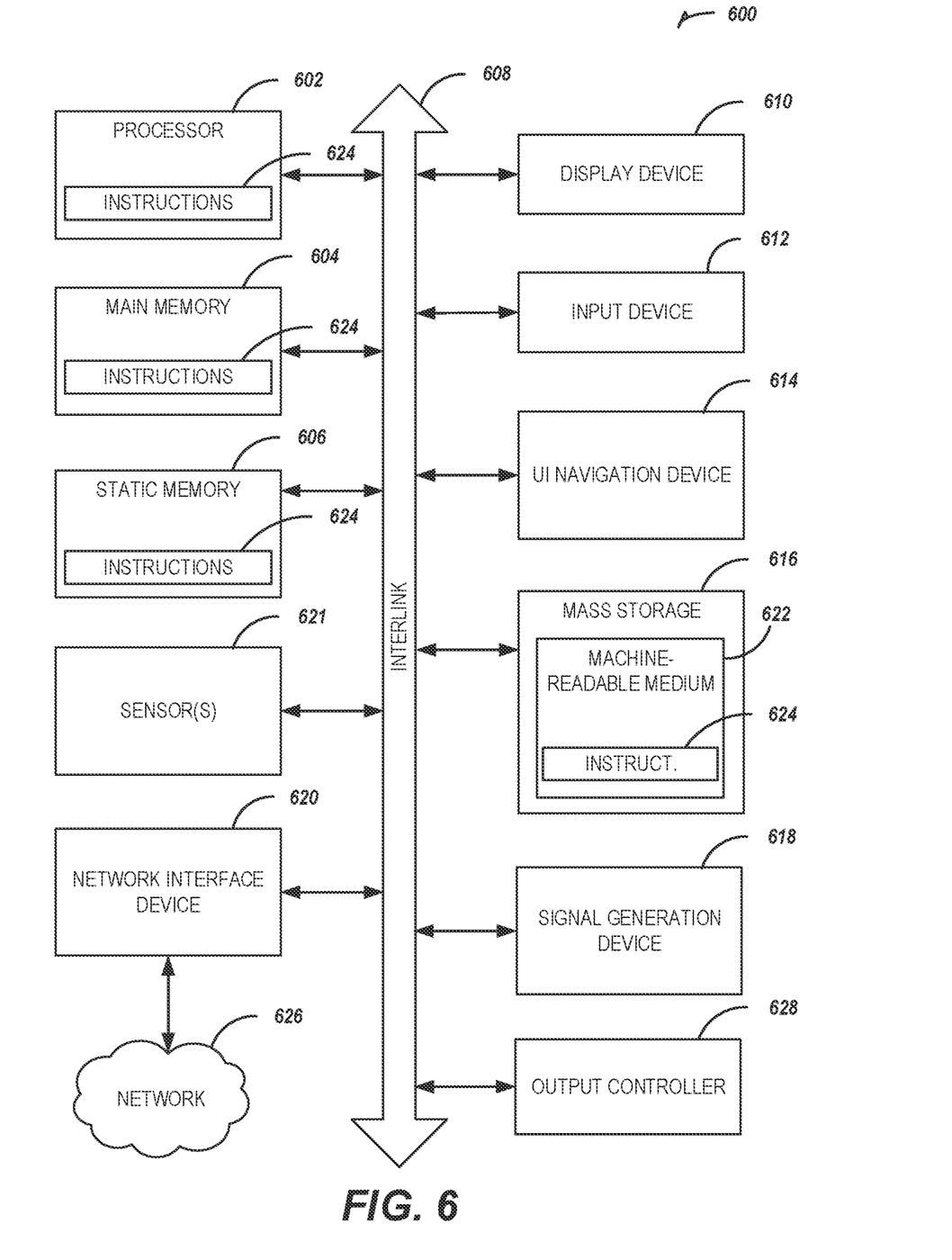
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for automatic cache propagation comprising:
   at least one processor; and
   memory including instructions that, when executed by the at least one processor, cause the at least one processor to perform operations to:
      receive a request for an object of a webpage;
      determine a cache state for a cache control header retrieved for the object;
      calculate a time to live value for the object based on the cache state and a header time to live value included in the cache control header;
      store a cache directive that includes the time to live value for the object in a cache; and
      update the object in the cache upon receipt of a subsequent request based on the cache directive.

2. The system of claim 1, the memory further comprising instructions that, when executed by the at least one processor, cause the at least one processor to perform operations to:
   store metadata for the object in the cache that includes an expiration time for the object; and
   return a maximum age value calculated from the metadata for the object in response to receipt of the subsequent request.

3. The system of claim 2, wherein the object is updated based on a determination that a time of the subsequent request exceeds the maximum age value.

4. The system of claim 2, wherein the maximum age value is calculated by rounding a lowest maximum age value from a set of maximum age values for the object.

5. The system of claim 1, wherein the cache state indicates a status of the object in the cache between a time the object is stored in the cache and a time the object in the cache is expired.

6. The system of claim 1, the memory further comprising instructions that, when executed by the at least one processor, cause the at least one processor to perform operations to:
   generate a minimum time to live value and a maximum time to live value for the object, wherein the cache state is determined at least in part using the minimum time to live value and the maximum time to live value.

7. The system of claim 1, wherein the time to live value includes a fresh time to live portion and a stale time to live portion and the memory further comprising instructions that, when executed by the at least one processor, cause the at least one processor to perform operations to:
   retrieve the object from the cache when a time of the subsequent request falls within the fresh time to live portion; and
   validate the object when the time of the subsequent request falls within the stale time to live portion.

8. At least one non-transitory machine-readable medium including instructions for automatic cache propagation that, when executed by at least one processor, cause the at least one processor to perform operations to:
   receive a request for an object of a webpage;
   determine a cache state for a cache control header retrieved for the object;
   calculate a time to live value for the object based on the cache state and a header time to live value included in the cache control header;
   store a cache directive that includes the time to live value for the object in a cache; and
   update the object in the cache upon receipt of a subsequent request based on the cache directive.

9. The at least one non-transitory machine-readable medium of claim 8, further comprising instructions that, when executed by the at least one processor, cause the at least one processor to perform operations to:
   store metadata for the object in the cache that includes an expiration time for the object; and
   return a maximum age value calculated from the metadata for the object in response to receipt of the subsequent request.

10. The at least one non-transitory machine-readable medium of claim 9, wherein the object is updated based on a determination that a time of the subsequent request exceeds the maximum age value.

11. The at least one non-transitory machine-readable medium of claim 9, wherein the maximum age value is calculated by rounding a lowest maximum age value from a set of maximum age values for the object.

12. The at least one non-transitory machine-readable medium of claim 8, wherein the cache state indicates a status of the object in the cache between a time the object is stored in the cache and a time the object in the cache is expired.

13. The at least one non-transitory machine-readable medium of claim 8, further comprising instructions that, when executed by the at least one processor, cause the at least one processor to perform operations to:
   generate a minimum time to live value and a maximum time to live value for the object, wherein the cache state is determined at least in part using the minimum time to live value and the maximum time to live value.

14. The at least one non-transitory machine-readable medium of claim 8, wherein the time to live value includes a fresh time to live portion and a stale time to live portion and further comprising instructions that, when executed by the at least one processor, cause the at least one processor to perform operations to:
- retrieve the object from the cache when a time of the subsequent request falls within the fresh time to live portion; and
- validate the object when the time of the subsequent request falls within the stale time to live portion.

15. A method for automatic cache propagation comprising:
- receiving a request for an object of a webpage;
- determining a cache state for a cache control header retrieved for the object;
- calculating a time to live value for the object based on the cache state and a header time to live value included in the cache control header;
- storing a cache directive including the time to live value for the object in a cache; and
- updating the object in the cache upon receipt of a subsequent request based on the cache directive.

16. The method of claim 15, further comprising:
- storing metadata for the object in the cache including an expiration time for the object; and
- returning a maximum age value calculated from the metadata for the object in response to receipt of the subsequent request.

17. The method of claim 16, wherein the object is updated based on a determination that a time of the subsequent request exceeds the maximum age value.

18. The method of claim 16, wherein the maximum age value is calculated by rounding a lowest maximum age value from a set of maximum age values for the object.

19. The method of claim 15, wherein the cache state indicates a status of the object in the cache between a time the object is stored in the cache and a time the object in the cache is expired.

20. The method of claim 15, further comprising:
- generating a minimum time to live value and a maximum time to live value for the object, wherein the cache state is determined at least in part using the minimum time to live value and the maximum time to live value.

21. The method of claim 15, wherein the time to live value includes a fresh time to live portion and a stale time to live portion and further comprising:
- retrieving the object from the cache when a time of the subsequent request falls within the fresh time to live portion; and
- validating the object when the time of the subsequent request falls within the stale time to live portion.

* * * * *